US006294127B1

United States Patent
Huse

(10) Patent No.: US 6,294,127 B1
(45) Date of Patent: Sep. 25, 2001

(54) FUEL TANK HAVING MOLDED REINFORCEMENTS AND METHOD OF MAKING SAME

(75) Inventor: O. C. Huse, Arlington, TX (US)

(73) Assignee: The Moore Company, Westerly, RI (US)

( * ) Notice: Subject to any disclaimer, the term of this patent is extended or adjusted under 35 U.S.C. 154(b) by 0 days.

(21) Appl. No.: 09/079,726

(22) Filed: May 15, 1998

(51) Int. Cl.$^7$ ................................................. B29C 49/20
(52) U.S. Cl. ......................... 264/516; 264/512; 264/513; 264/515
(58) Field of Search ....................... 264/512, 513, 264/515, 516, 255, 271.1, 275; 425/577; 249/91, 93

(56) References Cited

U.S. PATENT DOCUMENTS

| | | | |
|---|---|---|---|
| 3,479,421 | * 11/1969 | Armbruster et al. | 264/516 |
| 4,207,284 | * 6/1980 | Speas | 264/516 |
| 4,215,089 | * 7/1980 | Uhlig et al. | 264/516 |
| 4,307,059 | * 12/1981 | Cambio et al. | 264/516 |
| 4,952,133 | * 8/1990 | Hasegawa et al. | 264/516 |
| 5,100,204 | * 3/1992 | Makihara et al. | 264/516 |

FOREIGN PATENT DOCUMENTS

| | | | |
|---|---|---|---|
| 61-123514 | * 6/1986 | (JP) | 264/516 |
| 62-101420 | * 5/1987 | (JP) | 264/516 |
| 1-202420 | * 8/1989 | (JP) | 264/516 |

* cited by examiner

Primary Examiner—Jan H. Silbaugh
Assistant Examiner—Suzanne E McDowell
(74) Attorney, Agent, or Firm—Howard & Howard

(57) ABSTRACT

A container assembly includes a container body formed of a thermoplastic material having an inner surface, an outer surface, and at least one corner having a reinforcement molded to the outer surface of the corner. The reinforcement has a peripheral edge, which is partially embedded in the outer surface of the container body. A method of making a container assembly comprises the step of molding a container body over a portion of a reinforcement. A reinforcement having a peripheral edge is disposed in a mold. A fluid thermoplastic material is disposed into the mold. The thermoplastic material is then molded over the inner surface of the mold and the peripheral edge of the reinforcement thereby forming the container body. The thermoplastic material contacts the peripheral edge and melts or softens the edge. A peripheral edge is then brought into engagement with the container body to provide a secure seal between the reinforcement and the container body.

12 Claims, 3 Drawing Sheets

FUEL TANK HAVING MOLDED REINFORCEMENTS AND METHOD OF MAKING SAME

TECHNICAL FIELD

The subject invention generally relates to marine fuel tank assemblies and, more specifically to a blow-molded fuel tank assembly having reinforced corners and a method of making same. The method includes the step of molding reinforcements over a portion of a plastic fuel tank body.

Traditionally, plastic containers, such as fuel tanks, have been molded by a variety of techniques such as roto-molding and blow-molding. Historically, blow-molded fuel tanks have been disfavored since their corners are inherently thin. The thin corners leads to inherent weaknesses in the fuel tanks. Because fuel tanks must meet stringent governmental standards for both permeation and fire resistance, the prior art blow-molded tanks have been disfavored due to their proclivity towards permeation of fuel and decreased resistance to fire.

The prior art has not successfully addressed the problems set forth above for blow-molded fuel tanks. Thus, there has been a need for an improved blow-molded plastic container assembly which provides increased strength, low permeability, and increased fire resistance. There has also been a need for an improved blow-molding method of manufacturing these container assemblies.

SUMMARY OF THE INVENTION

The improved storage tank assembly of the present invention provides a blow-molded fluid sealed tank assembly without weakened corners which are typical in blow-molded plastic fuel tanks. The container assembly includes a plastic container body and at least one corner reinforcement. The reinforcement is molded over an outer surface of at least one corner of the container body. The reinforcement includes a peripheral edge which is partially embedded in the outer surface of the container body. The peripheral edge is also partially deformed and becomes partially cohesive with the outer surface of the container body providing locking engagement between the reinforcement and the container body.

In a method according to the present invention, a reinforcement is molded over the corner of a plastic container body leaving a portion of the reinforcement partially embedded in the molded container body. A mold is provided having an inner surface and an orifice, wherein the inner surface of the mold defines an outer surface of the container body. A reinforcement is disposed in the mold orifice with the portion of the reinforcement to be embedded into the container body positioned in the mold. The reinforcement also includes at least one peripheral edge which is partially embedded in the container body. A fluid thermoplastic material is introduced into the mold and forced against the inner surface of the mold and the peripheral edge of the reinforcement. The fluid thermoplastic material softens or partially melts the peripheral edge of the reinforcement. The peripheral edge is partially deformed forming a locking engagement between the container body and the reinforcement. The thermoplastic material comprising the container body and the thermoplastic material comprising the reinforcement can also cohesively bond together providing a secure seal between the container body and the reinforcement. Thus, sufficient thickness can be obtained at the corners without using greater amounts of plastic in the blow-mold process.

In the preferred embodiment, a blow-molded process is used to mold the container assembly. In this process, a fluid parison of thermoplastic material is introduced into the mold and a pressurized gas charge is introduced into the parison expanding the parison and confirming the parison to the inner surface of the mold. The thermoplastic reinforcement is preferably made by injection molding utilizing the same thermoplastic material as is used to form the container body.

The ability to produce parts with good material thickness in corners without making the balance of the part much too thick just to improve corners.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION

Figure 1:
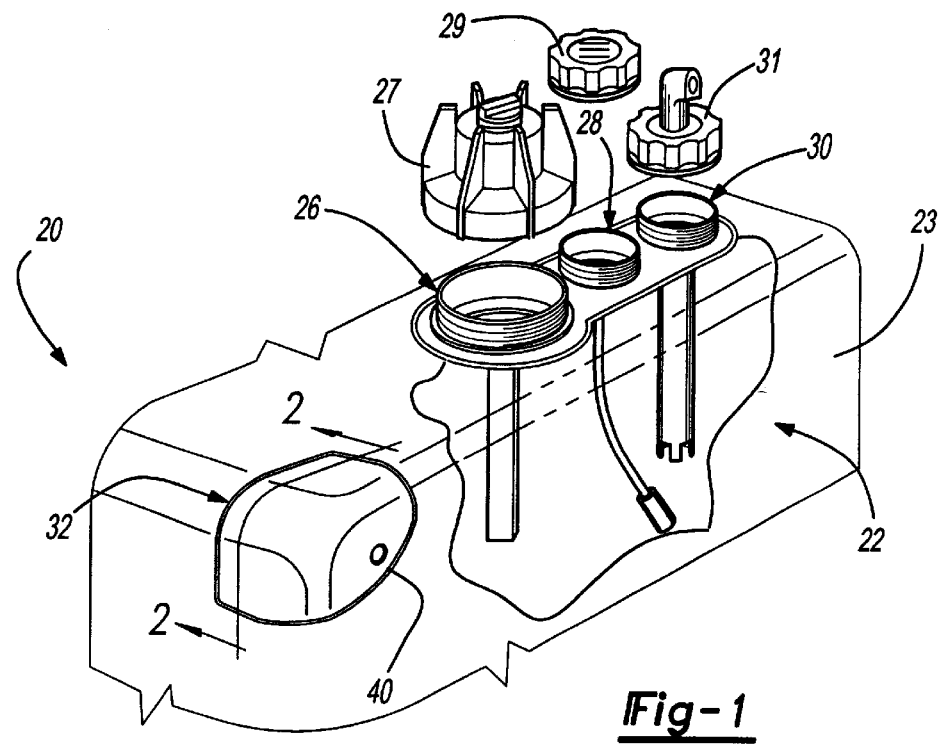
FIG. 1 is a perspective view of a plastic container assembly in accordance with the present invention.

Referring to FIG. 1, a storage tank or container assembly according to the present invention is generally shown at 20. The tank includes a container body 22 which defines an interior 24 of the tank assembly 20. The container body 22 is constructed of a plastic material, such as a thermoplastic, of the type known in the art, which is preferably made by a blow-molding process or other known processes. The thermoplastic material which comprises the container body 22 is preferably a high density polyethylene plastic material and has a general thickness of approximately 2 to 4 millimeters.

The tank assembly 20 also includes a plurality of fixtures 26, 28, 30. Fixtures 26, 28, 30, are pre-fabricated pieces and comprise, for example, an injection molded thermoplastic material. Fixtures 26, 28, 30 preferably comprise a high density polyethylene thermoplastic material. For reasons set forth below, the container body 22 and fixtures 26, 28, 30 preferably are made from the same thermoplastic material. However, fixtures 26, 28, 30 will be thicker than the material container body 22. Typically, fixtures 26, 28, 30 will have a general thickness of approximately 4 to 7 millimeters. Fixtures 26, 28, 30 can each have a portion embedded in the container body 22, as described below. Each fixture 26, 28, 30 provides an opening into the interior 24 of the tank assembly 20. Each fixture has a cap associated therewith which seals the interior 24 to retain a fluid in the interior 24 of the container assembly 20.

The tank assembly 20 illustrated in FIG. 1 is a fuel tank of the type utilized in the marine industry. The fuel tank 20 includes an inlet cap 28 associated with fixture 26 through which fuel can be pumped into the fuel tank 20. The fuel tank 20 also includes a fuel gauge assembly and a fuel line assembly 31 both associated with the fixtures 28 and 30, respectively. Fuel disposed in the tank 20 is drawn through the fuel line assembly 31 and is conveyed through a fuel line to an engine. Although a fuel tank is illustrated, it should be understood that this invention extends to other types of containers. Thus, the invention will be described generally as relating to a conventional container assembly.

As shown in FIG. 1, each fixture 26, 28, 30 has a threaded outer surface which receives the cap 27, 29, 31, respectively. The fixtures 26, 28, 30 allow for interchangeable components to be used. The fixtures 26, 28, 30 are uniformly designed receptacles adapted to receive any desired components. As should be apparent, the components illustrated could be assembled in the various fixture openings. For example, the cap 27 could be mounted in the middle and the fuel gauge 28 could be mounted on the end.

The fixtures 26, 28, 30 are embedded in the plastic container body 22. This is shown and described in greater detail in co-pending application U.S. Ser. No. 08/704,130, assigned to the assignee of the present invention, and incorporated herein by reference.

Figure 2:
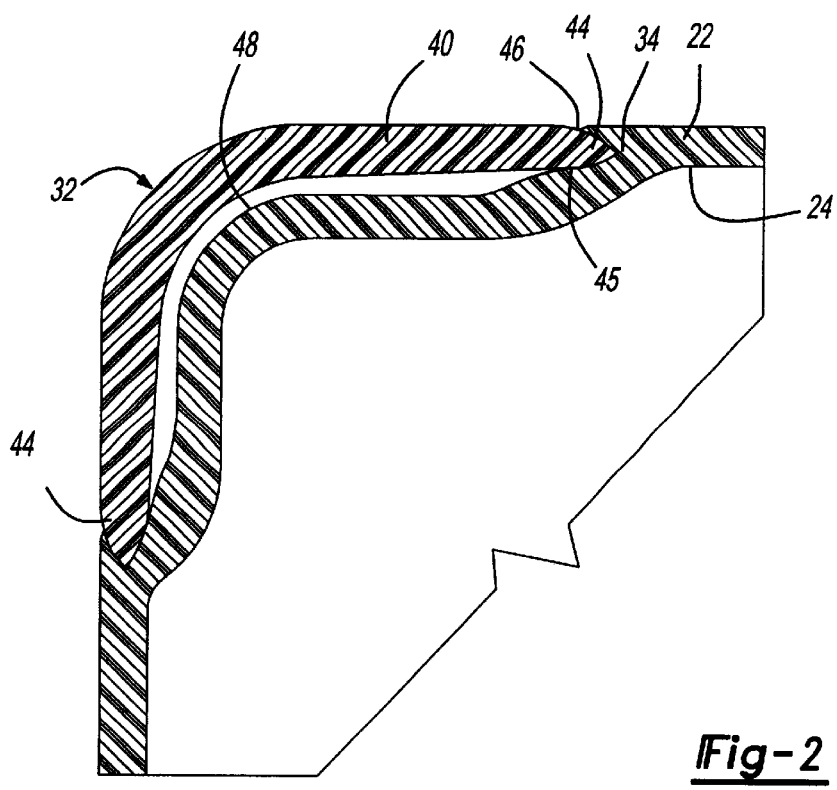
FIG. 2 is a partial cross-sectional view of the reinforcement and container body of the assembly taken along line 2—2 of FIG. 1.
Figure 3:
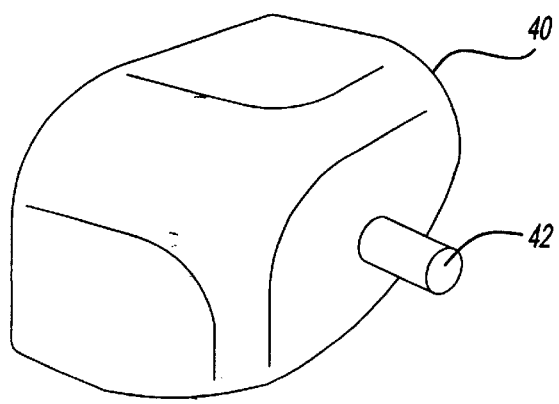
FIG. 3 is a perspective view of the reinforcement in accordance with the present invention.

Referring to FIGS. 1–3, the container assembly 20 is shown having its top, bottom, and side walls intersecting in at least corner 32. The corner 32 includes a reinforcement 40 disposed on an outer surface 34 of the corner 32. Referring specifically to FIG. 3, the corner reinforcement 40 can include an indexing pin 42 disposed on a surface thereof which provides a mechanism for inserting and retaining the corner reinforcement 40 in a mold, which will be discussed in greater detail below.

Referring specifically to FIG. 2, the corner reinforcement 40 has a coextensive peripheral edge 44. The peripheral edge 44 has a substantially tapered cross-section. The peripheral edge 44 of the corner reinforcement 40 is partially embedded in the outer surface 34 of the container body 22. That is, upon molding of the tank body 22, the molten thermoplastic material comprising the tank body 22 engulfs a portion of the peripheral edge 44. The thermoplastic material which comprises the outer surface 34 of the corner substantially engulfs a bottom surface 45 of the peripheral edge 44 and substantially covers a top surface 46 of the peripheral edge. However, the plastic material comprising the tank body 22 is not disposed over any other portion of the corner reinforcement 40.

The peripheral edge 44 of the corner reinforcement 40 can also become partially cohesive with the outer surface 23 of the tank body 22. That is, if compatible thermoplastic materials are utilized for both the corner reinforcement 40 and the tank body 22, the materials comprising the respective parts can form a cohesive bond therebetween. Additionally, the peripheral edge 44 of the reinforcement 40 can be partially deformed by the hot thermoplastic material comprising the tank body 22 and can thus provide locking engagement between the reinforcement 40 and the container body 22. That is, the deformed peripheral edge 44 allows for a mechanical lock to be formed between the deformed peripheral edge 44 having the material comprising the tank body 22 disposed thereover.

As shown in FIG. 2, the outside wall of the corner 34 coexists with the corner reinforcement 40. That is, although the corner reinforcement 40 is disposed about the outside corner 34, both the outside corner 34 and the reinforcement 40 exist independently. A void space or gap 48 can be formed during the molding operation.

Figure 7:
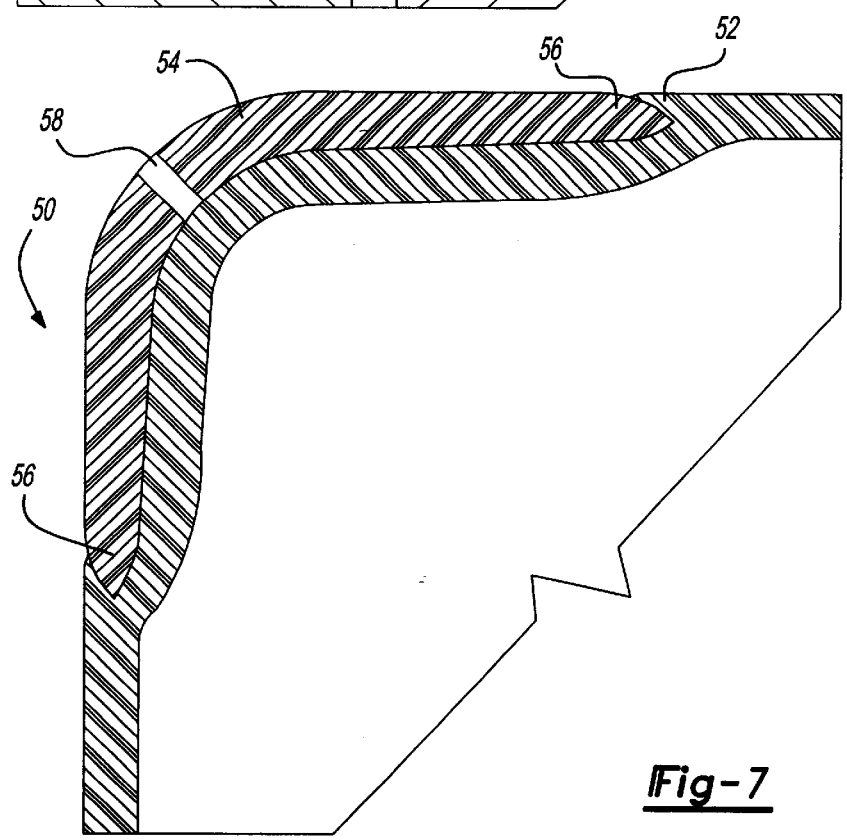
FIG. 7 is a cross-sectional view of an alternative embodiment of the container assembly in accordance with the present invention.

Referring to FIG. 7, an alternative embodiment of the present invention is shown. In this embodiment, an alternative corner assembly is shown. The corner assembly 50 includes a corner reinforcement 54 molded to an outer surface 52 of a corner. The reinforcement 54 includes a peripheral edge 56 and a vent hole 58. The vent hole is provided to allow for the exchange of fluid between the reinforcement 54 and the hot thermoplastic material comprising the outside corner 52. The vent 58 allows for the elimination of the void 48 shown in FIG. 2.

Figure 4:
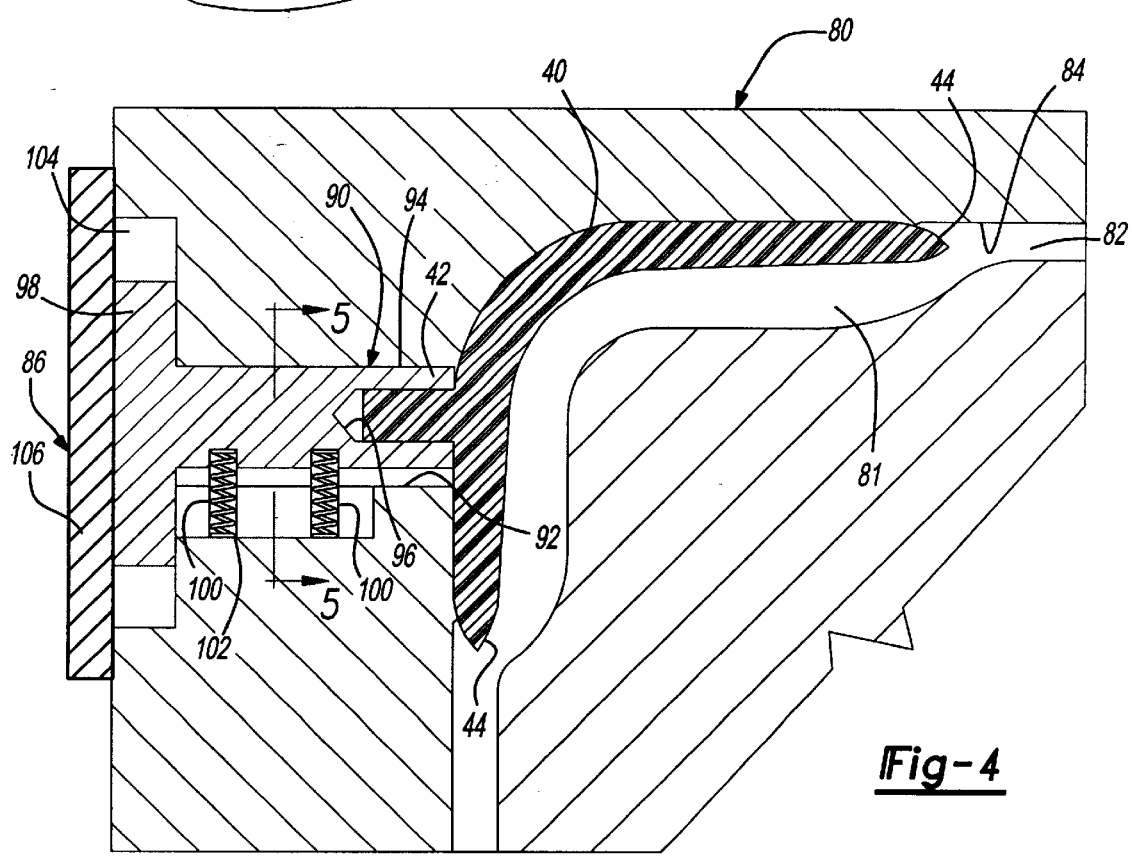
FIG. 4 is a cross-sectional view of the reinforcement during a molding step of a method in accordance with the present invention.
Figure 5:
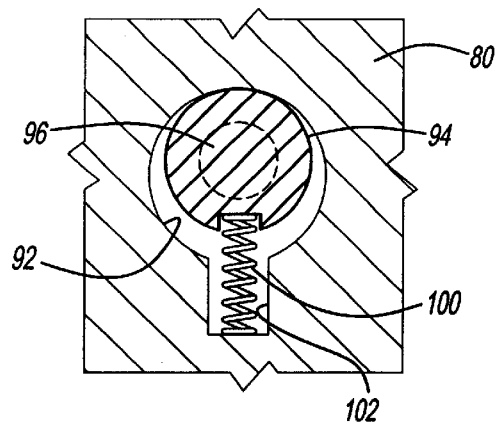
FIG. 5 is a cross-sectional view of a receiver in accordance with the present invention taken along line 5—5 of FIG. 4.
Figure 6:
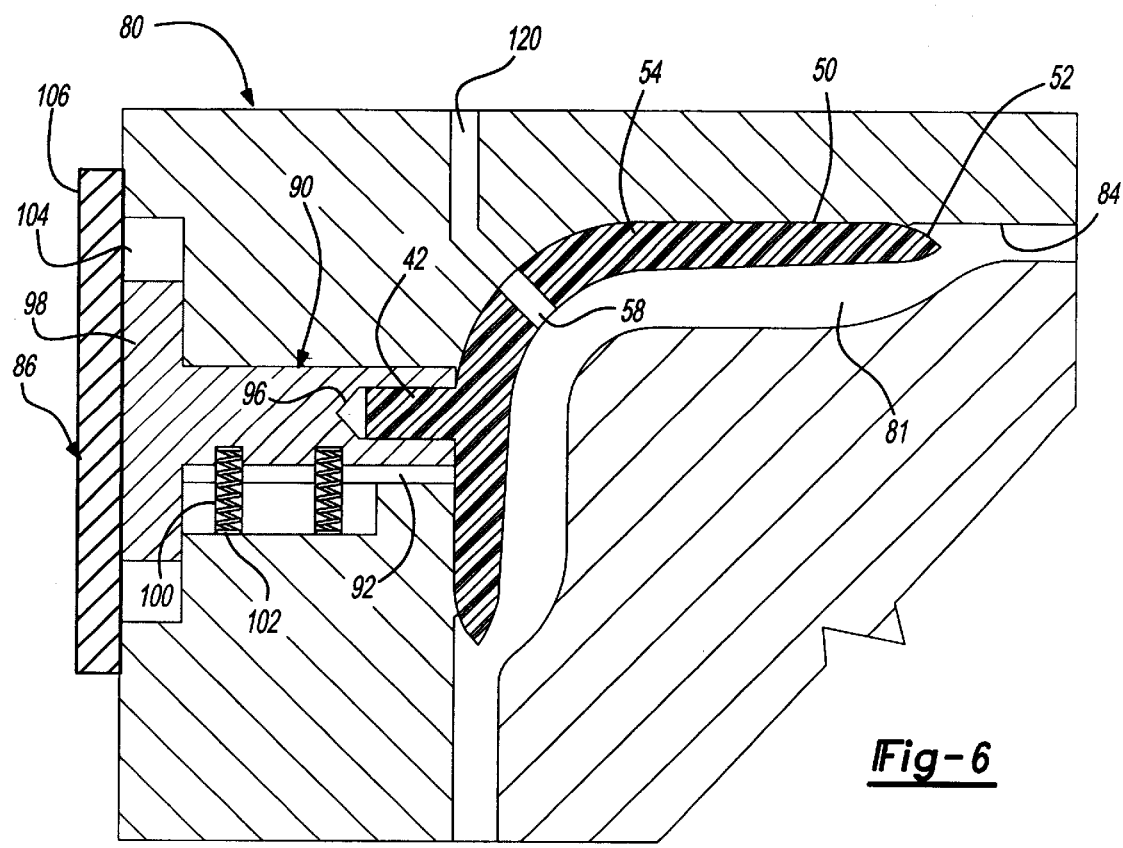
FIG. 6 is a cross-sectional view of an alternative embodiment of the reinforcement in an orifice of a mold prior to a molding step of a method of the present invention.

In FIGS. 4–6, a process of the present invention is illustrated. As shown in FIG. 4, the corner reinforcement 40 is placed in an orifice 82 of a mold 80. An inner surface 84 of the mold 80 defines an outer surface 23 of the container body 22. The corner reinforcement 40 is disposed in the mold 80. The corner reinforcement 40 is secured in the mold 80 by inserting the pin 42 into an indexing mechanism 86. The indexing mechanism 86 includes a receiver 90 disposed in an aperture 92 of the mold 80. The receiver 90 includes a cylindrical portion 94 disposed in the aperture 92. The cylindrical portion 94 includes a bore 96 adapted to receive and retain the pin 42 of the corner reinforcement 40 therein. The receiver 90 further includes a base portion 98 disposed in a recess 104. The base portion 98 is laterally displaceable within the recess 104.

Springs 100 disposed in bores 102 laterally bias the receiver 90 within the aperture 92. When the pin 42 of the corner reinforcement 40 is disposed within the bore 96 of the receiver 90, the springs 100 provide a lateral force on the receiver 90 to force the corner reinforcement 40 into engagement with the inner surface 84 of the mold 80. This mechanism insures that the corner reinforcement 40 will be maintained in its proper position during the molding operation and to allow controlled movement of the corner reinforcement 40 due to molding forces and thermodynamic effects such as expansion and contraction of the materials disposed within the mold 80. A keeper plate 106 disposed adjacent to the base portion 98 and the recess 104 retains the indexing mechanism within the mold 80.

As discussed above, a vent hole 58 can be disposed in the corner reinforcement 54. With reference to FIG. 6, the mold 80 includes a vent 120 disposed in fluid communication with the vent hole 58 of the corner reinforcement 54 to allow for the flow of fluid therebetween.

In the process of the present invention, a hot fluid thermoplastic material is simultaneously disposed over both the inner surface 84 of the mold 80 and the peripheral edge 44, 52 of the corner reinforcement 40, 54. This step can be performed, for example, by any plastic molding method which is well known in the art. The preferred plastic molding method is blow-molding. In this process, a molten parison of fluid thermoplastic material may be disposed in the interior 81 of the mold 80. A pressurized gas, such as air, is then blown into the parison in the mold 80, thereby expanding the parison and conforming the parison to the inner surface 84 of the mold 80. The hot fluid thermoplastic material contacts the peripheral edge 44, 52 of the corner insert 40, 54 and can begin to soften or even melt at least a portion of the peripheral edge 44, 52.

The fluid thermoplastic material cools and hardens forming the container body 22. As the fluid thermoplastic material cools, limited shrinkage of the thermoplastic material can occur, drawing the peripheral edge 44, 52 and the container body 22 together. The peripheral edge 44, 52 can be deformed, thereby producing locking engagement with the container body 22. Additionally, as discussed above, cohesive bonding between the peripheral edge 44, 52 and the fluid plastic material comprising the container body 22 can also occur.

A preferred description of this invention has been disclosed; however, one of ordinary skill in the art would recognize that certain modifications would come within the scope of this invention. For that reason, the following claims should be studied in order to determine the true scope and content of this invention.

What is claimed is:

1. A method of making a container assembly having reinforced corners, said method comprising the steps of:

disposing a reinforcement into a mold, the mold having an inner surface defining an outer surface of a container, wherein the reinforcement includes a peripheral edge;

forming a container body by disposing a molten parison of a fluid thermoplastic material into the mold and simultaneously molding the thermoplastic material over the inner surface of the mold and over the peripheral edge of the reinforcement, thereby forming the container body and molding the reinforcement to the container body;

providing the reinforcement with an indexing pin disposed on its outer surface, and providing the mold with an indexing assembly for receiving the indexing pin disposed on the reinforcement, whereby the reinforcement is retained in position during said forming step.

2. A method as set forth in claim 1, wherein said forming step is further defined as forming a container body having walls defining the container, the reinforcement and the walls being coexistent.

3. A method as set forth in claim 2, wherein said forming step is further defined as partially cohesively bonding the peripheral edge with the outer surface of the container body.

4. A method as set forth in claim 3 further including the step of deforming the peripheral edge to provide locking engagement between the reinforcement and the container body.

5. A method as set forth in claim 1, wherein thermoplastic material is polyethylene.

6. A method as set forth in claim 1, wherein the reinforcement is injection molded of a thermoplastic material.

7. A method as set forth in claim 6, wherein the thermoplastic material is polyethylene.

8. A method as set forth in claim 1, wherein said forming step is further defined as disposing a parison of a fluid thermoplastic material in the mold.

9. A method as set forth in claim 8 further including the step of blowing a pressurized gas into the parison, thereby expanding the parison and conforming the parison to the inner surface of the mold.

10. A method as set forth in claim 1, wherein the indexing pin includes biasing means for maintaining controlled positioning of the reinforcement.

11. A method as set forth in claim 10, wherein the biasing means includes a receiver disposed in a first aperture in the mold, said receiver including at one end a cylindrical portion having a bore for receiving the index pin disposed on the reinforcement and a base portion disposed at the opposite end, the receiver being laterally displaceable within the aperture.

12. A method as set forth in claim 10, wherein the biasing means includes a spring disposed in a second aperture in the mold, the spring being perpendicularly disposed with respect to the cylindrical portion, whereby the spring radially biases the receiver within the first aperture.

* * * * *